United States Patent Office 3,502,631
Patented Mar. 24, 1970

3,502,631
POLYMERS OF CYCLIC INTERNAL OLEFINS
Burton C. Anderson, Graylyn Crest, Wilmington, Del.,
assignor to E. I. du Pont de Nemours and Company,
Wilmington, Del., a corporation of Delaware
No Drawing. Filed Apr. 7, 1966, Ser. No. 540,851
Int. Cl. C08f 5/00
U.S. Cl. 260—93.1
3 Claims

ABSTRACT OF THE DISCLOSURE

Cycloalkenes having at least 5 carbon atoms in the ring can be polymerized to polymers having a molecular weight of at least 800 by heating the monomers to temperatures of 200° C. to 400° C. at pressures of 20 to 100 kilobars. The polymers range from viscous oils to hard solids.

---

This invention relates to organic polymers. More specifically, it concerns high-molecular-weight polycycloalkanes having at least 5 carbon atoms in the ring, and to a method for their preparation from the corresponding cycloalkene ring unsaturated monomer.

The polymers of this invention have molecular weights of at least 800 and are represented by the sole recurring structural unit

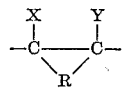

wherein R is alkylene of 3 through 10 carbon atoms which can contain up to three substituents, that can be the same or different, selected from lower alkyl, halogen (fluorine, chlorine, bromine or iodine), —COOR$^1$, —COCH$_3$, —OR$^1$ or phenyl, where R$^1$ is lower alkyl; and X and Y each are selected from hydrogen, methyl, ethyl, —COCH$_3$, —COOR$^1$, —OR$^1$ or phenyl, where R$^1$ is as defined above. Lower alkyl is defined as an alkyl group that contains 1 through 8 carbon atoms.

The novel polymers are prepared by the process aspect of this invention which comprises subjecting the corresponding cyclic olefins, i.e.,

to pressures ranging from 20 to 100 kilobars and temperatures ranging from 200° to 400° C. until polymerization takes place. Time of reaction is not critical, and times ranging from 0.5 to 20 hours are generally employed. The exact pressure, temperature, and time required for polymerization within the above-defined ranges are dependent on the particular monomers being polymerized. Thus, some of the monomers polymerize at 200° C. under 30 kilobars (kb.) pressure in 4 hours; other monomers polymerize at 350° C. under 65 kb. pressure in 4 hours; and others at 300° C. under 65 kb. pressure for 3 hours. In general, preferred polymerizing conditions range from 250° to 350° C. at pressures of 60–70 kb. for 3–6 hours.

The structural formula of the novel polymers includes both homopolymers and copolymers of two or more cyclic olefins prepared by polymerizing mixtures of two or more of the monomers in the desired proportions. Usually the minor component of the mixture to be copolymerized amounts to at least 10 mole percent of the total monomers.

Polymerizations at pressures in the lower portion of the above-specified operable range, e.g., 20–30 kb., are conveniently carried out in apparatus of the Bridgman monobloc type. This type of pressure equipment is described in P. W. Bridgman, Physical Review, 48, 893 (1935) and P. W. Bridgman, Am. Scientist, 31, 16 (1943).

Polymerizations at the higher pressure ranges specified above, e.g., 60–70 kb., are conveniently carried out in a tetrahedral anvil device of the type described in U.S. Patent 2,918,699, as modified in Journal of Res., Nat. Bureau Stds. 63c, 59 (1959) by E. C. Lloyd, et al.

In carrying out polymerization with the tetrahedral anvil device, it is convenient to use special containers or ampoules, such as described below, for the liquid monomers. In one type of container, a platinum vessel, 0.145 in. in outside diameter x 0.008 in. wall x 9/16 in. long, closed on one end, is filled with a liquid sample. A section 0.30 in. long at the open end is flattened, and the portion of the flattened end nearest the middle is placed between the jaws of a small vise. The jaws of the vise are about 1/16 in. wide, and the vise is tightened to 20 inch-pounds of torque to seal the capsule during welding. The bottom of the platinum capsule is cooled in solid CO$_2$-trichloroethylene slush or liquid nitrogen, and the top is welded shut with a natural gas-oxygen flame. The flattened part of the ampoule is then bent double, and the ampoule is placed in a die and surrounded by a powdered non-conductor such as boron nitride. Pressure is applied to the die, and a cohesive cylinder is obtained. The cylinder is fitted with a conductive heater and inserted into a pyrophyllite tetrahedron for pressuring in the tetrahedral anvil device.

Alternatively, the sealed ampoule can be compacted in the die with or without a suitable powdered metal surrounding the ampoule to form a cylinder which is then inserted into the pyrophyllite tetrahedron ready for pressuring. In this embodiment, the platinum metal of the ampoule serves as the heater. Suitable powdered metals for use in this system include: zinc, tin, lead, copper, iron, platinum, aluminum, and chromium.

Another type of ampoule that is very satisfactory is one made of 0.166 in. O.D. x 0.005 in. wall x 0.4 in. long platinum tubing with 0.005 in. thick platinum discs soldered in the ends. A filter tube made of platinum tubing 0.062 in. O.D. with 0.0035 in. wall and 0.5 in. long is soldered in a hole in one end of the larger tube. The ampoule is charged by syringe, clamped in a vise with jaws 1/16 in. wide with 5 inch-pounds of torque to close the 0.062 in. tube, and sealed by welding the end of this tube while the ampoule is cooled in Dry Ice or liquid nitrogen. It is then ready for pressuring after insertion in a pyrophyllite tetrahedron.

The ampoules used are not limited to those described above, for any size of ampoule that will fit into the reaction chamber of the particular tetrahedral anvil device can be used. Also, the ampoules can be made of other metals besides platinum as desired. Other suitable metals include: gold, silver, stainless steel, nickel, and palladium.

To establish the quantity of pressure employed by the tetrahedral anvil device, it is necessary to correlate a measurable variable, viz, electrical resistivity, as a function of pressure. The device was pressure calibrated using bismuth, thallium and barium as calibrating materials at room temperature. In all cases, silver chloride was the surrounding medium and the combination was inserted in a 1.25 in. pyrolphyllite tetrahedron. The calibration points used appear in the 1963 edition of the American Institute of Physics Handbook, page 443, as follows (all values for ambient temperature):

Bisumth I→II 25.37±.02 kb.
Bismuth II→III 26.96±0.18 kb.
Thallium II→III 36.69±0.11 kb.
Barium II→III 59.0±1.0 kb.

All compressions in the following examples were made on the cold assembly and the charges then heated to the desired temperature as measured by a thermocouple. The pressure unit is a bar, equivalent to 10⁶ dynes/cm.². The larger unit, a kilobar, is used herein. No pressure correction for thermocouple behavior has been introduced, standard E.M.F. tables for 1 atm. being employed. The monomers are purified by conventional methods, e.g., distillation, crystallization, sublimation, or gas chromatography, shortly before use.

The following examples serve to illustrate the invention, but the invention is not limited to the specific examples shown:

EXAMPLE 1

Polymerization of cyclopentene

A cylindrical, platinum ampoule 0.167" in diameter and 0.38" long fitted with a 1/16" O.D. filler tube sealed in a 6 mm., soft glass tube was dried and evacuated below 0.1 mm. pressure. The tube was charged with cyclopentene freshly purified by large-scale gas chromatography. The filled ampoule was clamped in a vise tightened with a torque wrench so that the filler tube was sealed. The filler tube was cut above the vise, flattened and welded. The sealed ampoule containing 0.0549 g. of cyclopentene was placed in a tetrahedral anvil device and heated at 300° C. for 6 hours at 65 kb. The ampoule was recovered and opened and a solid block of polymer was removed from the center of the tube. Examination of the specimen by mass spectral analysis with direct injection at 250° C. showed a family of ions m/e in the 815–825 range. The largest number of ions was at 817 m/e. These ions were near the limit of sensitivity of the instrument used so that minimum molecular weight for the sample was over 800. In addition, examination of the spectrum showed lower families of ions 68 m/e apart indicating that the polymer is decomposing to monomer in the instrument.

EXAMPLE 2

Polymerization of cyclohexene

A sample of polycyclohexene was prepared by the procedure described in Example 1 above. Examination of this sample in a mass spectrograph with direct injection at 300° C. showed a family of ions in the 825–832 m/e range. The largest number of ions were in the 830–832 m/e range. Higher-molecular-weight ions could not be determined in this experiment since the limit of sensitivity of the instrument used is near 850 m/e. Examination of the spectrum showed families of ions about 82 m/e apart, again showing that polymer fragments decompose to monomer.

EXAMPLE 3

Polymerization of cycloheptene

A cylindrical, platinum ampoule similar to that described in Example 1 above was placed in a tetrahedral anvil device and heated at 350° C. for 3 hours at 65 kb. The product was a clear, translucent solid, which according to infrared analysis contained no unsaturation. Mass spectral examination of the sample by direct injection at 300° C. showed a family of ions in the 850–870 m/e range. Additional groups of ions about 96 m/e apart were seen indicating formation of cycloheptene monomer by the decomposing polymer. The mass spectral results confirm minimum molecular weight of the sample. Higher ions were not detected since the limit of sensitivity of the instrument used was near 850 m/e.

EXAMPLE 4

Polymerization of cyclohexene at 30 kb.

A 1/8-in. platinum tube with a 0.005-in. wall was welded closed at one end and filled with cyclohexene. The 9/16-in. long tube was flattened for about 0.30 in. from the top and the flattened portion was held at the bottom in a vise. The cyclohexene in the bottom of the tube was cooled with Dry Ice-trichloroethylene slush and the top of the flattened portion was welded shut. The platinum ampoule so obtained was packed in boron nitride and placed in the reaction chamber of a tetrahedral anvil device. The ampoule was pressured to 30 kb. and heated at 300° C. for 4 hours. The vessel was cooled under pressure and removed. When the ampoule was cut open, it contained a small amount of a white, waxy solid which was the polymer of cyclohexene.

EXAMPLE 5

Polymerization of cyclohexene at 65 kb.

An ampoule similar to that described in Example 4 but having an 0.008-in. wall was filled with 0.0506 g. of freshly distilled cyclohexene and welded. The ampoule (packed in boron nitride) was pressured in the tetrahedral anvil to 65 kb. and heated for 6 hours at 300° C. It was cooled under pressure and opened. There was obtained 0.0485 g. of white, hard polymeric product. The polymer was characterized by infrared absorption bands at 3.42, 3.49, 3.74, and 6.89μ. Weak bands at 11.2 and 11.8μ could be due to cyclohexene rings. No infrared absorption in the C methyl or double bond regions was found and these data confirm the 1,2-cyclohexyl structure of the polymer. Differential thermal analysis of a small sample of the polymer indicated a melting point of about 65° C. The inherent viscosity measured at 1% concentration in toluene was 0.025.

EXAMPLE 6

Polymerization of cyclohexene in Bridgman monobloc apparatus

Redistilled cyclohexene contained in a polytetrafluoroethylene container with a cylindrical sample cavity about 3/8" dia. x 3/8" high was heated at 22 kb. pressure to 300° C. for 4 hours in a Bridgman monobloc apparatus. The product of the reaction was 0.28 g. of a very viscous, colorless oil which was characterized by its infrared absorption as being very similar to the product of Example 5.

EXAMPLE 7

Polymerization of cyclopentene

A platinum ampoule prepared as described in Example 4 containing 0.032 g. of freshly distilled cyclopentene was pressured to 40 kb. in the tetrahedral anvil and heated for 4 hours at 300° C. The product was a viscous, colorless grease from which very fine fibers about 3 in. long could be drawn. The infrared absorption spectrum was very similar to that of polycyclohexene of Example 5 and showed no C methyl absorption or bands due to unsaturation. The inherent viscosity at 1% concentration in toluene was 0.05.

EXAMPLE 8

Polymerization of cyclopentene in the Bridgman monobloc apparatus

Redistilled cyclopentene contained in a polytetrafluoroethylene vessel of the type used in Example 6 was pressured to 22 kb. in a Bridgman monobloc apparatus and heated at 300° C. for 4 hours. The product obtained was a viscous, colorless oil which was characterized by infrared analysis as being very similar to the product of Example 7. The infrared absorption of this polymer was significantly different from other polymers made from $C_5$ unsaturated compounds including polypentene-1 and the polypenteneamers formed by ring-opening polymerization of cyclopentene.

EXAMPLE 9

Polymerization of 4-methylcyclohexene-1 at 65 kb.

A sample of freshly distilled 4-methylcyclohexene (0.0406 g.) was sealed in a platinum ampoule by the procedure described in Example 4 and polymerized by heating for 3 hours at 300° C. at 65 kb. in a tetrahedral anvil apparatus. The product obtained was a clear, somewhat brittle solid which melted on heating on a steam bath to a viscous liquid. The infrared absorption spectrum confirmed the polymeric structure having recurring cyclohexane rings in that no bands due to unsaturation could be seen.

EXAMPLE 10

Polymerization of cyclododecene

Freshly purified cyclododecene (0.0453 g.) was sealed in a platinum ampoule by the procedure described in Example 4. The ampoule was placed in the tetrahedral anvil, pressured to 65 kb. and heated at 300° C. for 3 hours. The product obtained was a clear, very viscous, glassy polymer from which thin fibers could be drawn. It was characterized by infrared absorption as the product of 1,2-polymerization of the double bond since no bands characteristic of methyl groups or unsaturation were found.

EXAMPLE 11

Polymerization of cyclooctene

Freshly distilled cyclooctene (0.0418 g.) was sealed in a small platinum ampoule as described in Example 4 and placed in the tetrahedral anvil device. It was pressured to 65 kb. and heated for 3 hours at 300° C. The product obtained was a solid, colorless glass from which clear fibers could be drawn. The infrared absorption spectrum confirmed the structure of the polymer as a saturated hydrocarbon. No bands due to C methyl absorption or unsaturation were found.

EXAMPLE 12

Polymerization of cycloheptene

A small platinum ampoule containing 37 mg. of freshly distilled cycloheptene was sealed as described in Example 4. The material was subjected to 65 kb. and 350° C. for 3 hours in a tetrahedral anvil device. The product was a brittle, translucent solid characterized by infrared analysis as a polymer containing no unsaturation and whose infrared absorption spectrum was quite similar to those of polycyclohexene and polycyclopentene.

EXAMPLE 13

Copolymerization of cyclopentene and cyclohexene

An equal molar mixture of cyclopentene and cyclohexene was heated in a sealed polytetrafluoroethylene container (⅜" x ⅜" as in Example 6) at 300° C. at 22 kb. for 6 hours in the Bridgman monobloc apparatus. There was obtained a viscous, clear oil characterized by infrared absorption as a polymer containing both cyclopentane and cyclohexane units.

The polymers of this invention have been illustrated in the preceding examples by reference to polymers of specific cycloolefins. However, the invention includes any polymer having recurring units of the general formula given hereinbefore. When the procedures of Examples 1-12 are carried out with the specific cyclic olefins listed by name and formula in the first column of the following Table I substituted for the specific olefins of these examples, the polymers listed by name and formula in the second column of Table I are obtained. Likewise when the comonomers of Example 13 are replaced by the comonomers listed in the first two columns of Table II and polymerizations carried out as in that example, copolymers having the recurring units listed in the third and fourth columns of Table II are obtained.

TABLE I

FURTHER EXAMPLES OF POLYMERS OF CYCLIC OLEFINS

| Monomer | Polymer |
|---|---|
|  3-Methylcyclopentene | 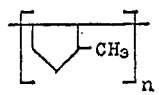 poly(3-methylcyclopentene) |
| 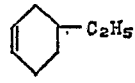 4-Ethylcyclohexene | 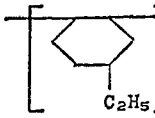 poly(4-ethylcyclohexene) |
|  5-n-butylcycloheptene | 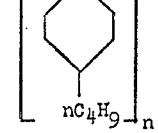 poly(5-n-butylcycloheptene) |
| 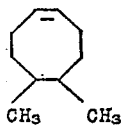 5,6-trans-dimethylcyclooctene | 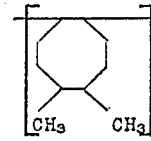 poly(5,6-trans-dimethylcyclooctene) |
| 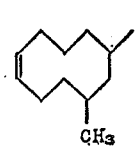 cis-6-ethyl-8-methyl-cyclodecene | 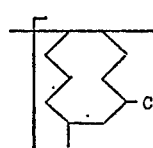 poly(cis-6-ethyl-8-methyl-cyclodecene) |

TABLE I (Continued)

| Monomer | Polymer |
|---|---|
| 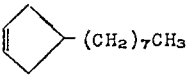<br>4-n-octylcyclopentene | 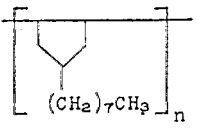<br>poly(4-n-octylcyclopentene) |
| 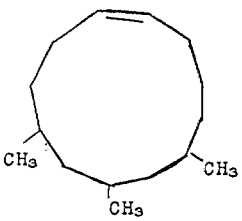<br>6,8,10-trimethylcyclododecene | 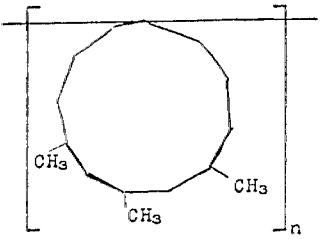<br>poly(6,8,10-trimethylcyclododecene) |
| 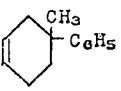<br>4-phenyl-4-methylcyclohexene | 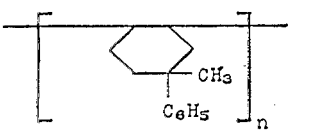<br>poly(4-phenyl-4-methylcyclohexene) |
| 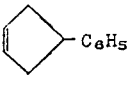<br>4-phenylcyclopentene | 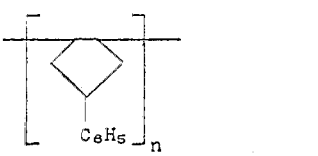<br>poly(4-phenylcyclopentene) |
| 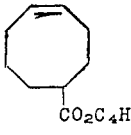<br>5-carbobutoxycyclooctene | 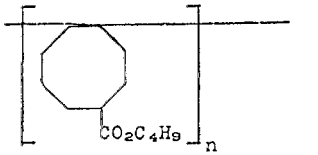<br>poly(5-carbobutoxycyclooctene) |
| 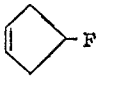<br>4-fluorocyclopentene | 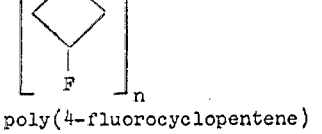<br>poly(4-fluorocyclopentene) |
| <br>4-chlorocyclohexene | 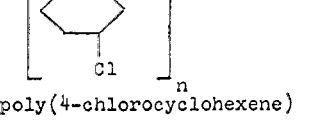<br>poly(4-chlorocyclohexene) |
| 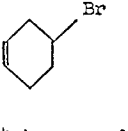<br>4-bromocyclohexene | 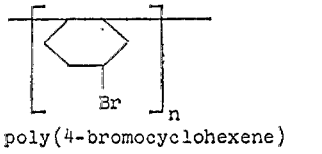<br>poly(4-bromocyclohexene) |
| 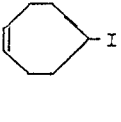<br>5-iodocycloheptene | 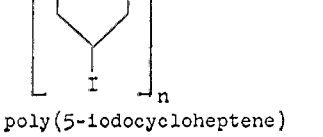<br>poly(5-iodocycloheptene) |

TABLE I (Continued)

| Monomer | Polymer |
|---|---|
|  4,4-bis(carboxymethyl)-cyclopentene | 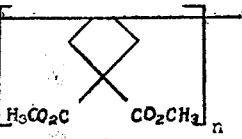 poly[4,4-bis(carboxymethyl)-cyclopentene] |
| 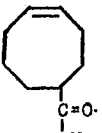 | 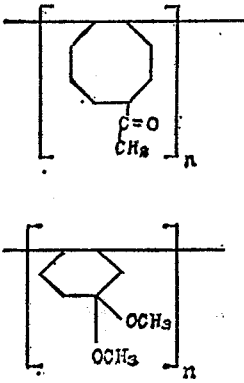 |
| 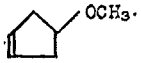 4,4-dimethoxycyclohexene | 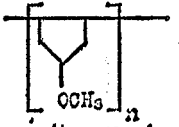 poly(4,4-dimethoxycyclohexene) |
| 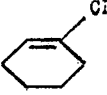 4-methoxycyclopentene | 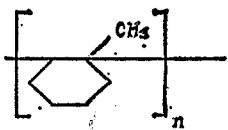 poly(4-methoxycyclopentene) |
| 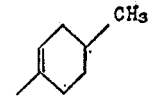 1-methylcyclohexene | 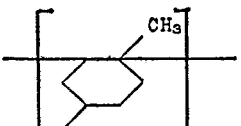 poly(1-methylcyclohexene) |
| 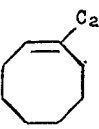 1,4-dimethylcyclohexene | 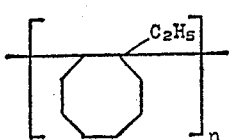 poly(1,4-dimethylcyclohexene) |
| 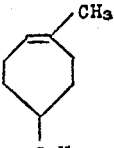 1-ethylcyclooctene | poly(1-ethylcyclooctene) |
| 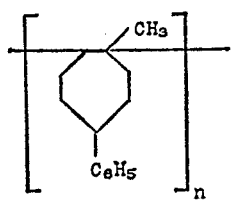 5-phenyl-1-methylcyclo-heptene | poly(5-phenyl-1-methylcyclo-heptene) |

TABLE I (Continued)

| Monomer | Polymer |
|---|---|
| 1-carbomethoxycyclohexene | poly(1-carbomethoxycyclohexene) |
| 1-acetylcyclohexene | poly(1-acetylcyclohexene) |
| 1-carboethoxycyclopentene | poly(1-carboethoxycyclopentene) |
| 1,2-dimethylcyclopentene | poly(1,2-dimethylcyclopentene) |
| 1,2-dimethylcyclohexene | poly(1,2-dimethylcyclohexene) |
| 1,2-dimethylcycloheptene | poly(1,2-dimethylcycloheptene) |
| 1-phenyl-2-methylcyclopentene | poly(1-phenyl-2-methylcyclopentene) |
| 2-carbomethoxy-1-methylcyclohexene | poly(2-carbomethoxy-1-methylcyclohexene) |
| 1-methoxy-2-methylcyclopentene | poly(1-methoxy-2-methylcyclopentene) |

TABLE I (Continued)

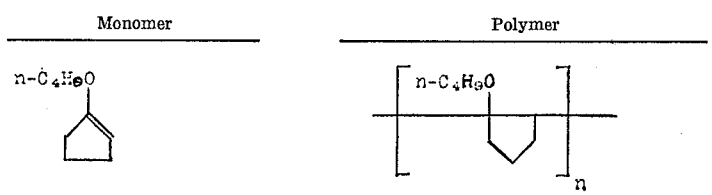

| Monomer | Polymer |
|---|---|
| 1-n-butoxycyclopentene | poly(1-n-butoxycyclopentene) |

TABLE II

COPOLYMERS OF CYCLIC OLEFINS

| Monomers | | Products (Recurring Units) | |
|---|---|---|---|
| cyclopentene | cyclohexene | | and |
| 4-methyl-cyclopentene | cyclohexene | (CH₃) | and |
| 4-methyl-cyclopentene | cyclopentene | (CH₃) | and |
| cyclooctene | cyclohexene | | and |
| 4-chloro-cyclohexene (Cl) | 4-methoxy-cyclopentene (OCH₃) | (Cl) | and (OCH₃) |
| 5,6-trans-dimethyl-cyclooctene (CH₃, CH₃) | 4-methyl-cyclopentene (CH₃) | (CH₃, CH₃) | and (CH₃) |
| cyclo-decene | cis-5-methyl-7-ethylcyclo-decene (CH₃, C₂H₅) | | and (CH₃, C₂H₅) |
| 5-n-butyl-cycloheptene (n-C₄H₉) | 5-acetyl-cyclooctene (CO-CH₃) | (n-C₄H₉) | and (C=O, CH₃) |

The monomeric cyclic olefins used in preparing the polymers of this invention can be prepared by methods described in the literature or by modifications of these standard methods. For example, alkyl substituted cyclic olefins can be prepared as described in Beilstein, V. 2, pp. 41–42, 44 and 46–48; J. Chromatography, 8, 349 (1962). Halo cyclic olefins are described in J. Org. Chem., 23, 1026 (1958) and Ber., 97, 132 (1964). Some carboalkoxy cyclic olefins are described in Beilstein, VI, 3, p. 58 and p. 213, and VI, 2, p. 30.

Because of availability, those cyclic internal olefins in which X and Y are hydrogen are preferred, i.e., the recurring structural units of the resulting polymer will have the formula

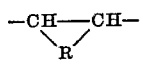

Of the polymers described by the formula immediately above, those wherein R is alkylene of 3 through 10 carbon atoms are preferred over those wherein R contains substituents. However, when R does contain substituents, lower alkyl constitutes a preferred class of substituents. Finally, because the resulting polymer is a solid, the instance wherein R is alkylene of 3–6 carbons constitutes an especially preferred group of polymers of this invention.

In addition, polymers wherein R is alkylene of 4–10 carbons are most preferred.

The polymeric cyclic olefins of this invention vary from viscous oils to hard solids and thus the usefulness of any particular polymer depends on the melting point and structure of the polymer, i.e., the type of substituents comprising X and Y and the R-substituted alkylenes. Thus, the polymers are useful in one or more of the following applications; namely, lubricants, waterproofing agents, fibers, films, and coating compositions.

By way of illustration, viscous oily polymers, such as the polycyclopentene described in Example 8, are useful as lubricants. For example, the viscous, oily, polycyclopentene was introduced into a glass bearing requiring lubrication. The joint was rotated and the polymer provided lubrication for the joint for several hours at room temperature without any sign of change.

The solid polymers and the greases are useful as water-resistant coatings. For example, a polycyclohexene similar to the polymer of Example 5 was dissolved in petroleum ether and a piece of filter paper was immersed in the solution. The treated paper was removed from the solution and the solvent evaporated, leaving dry paper which was not wetted when placed in water. Substantially, the same result was obtained when the copolymer of cyclopentene and cyclohexene of Example 13 was substituted for the polycyclohexene polymer of the preceding experiment.

In addition, the viscous polymers can be drawn into fibers, thus finding utility in applications involving fine fragile filaments.

Since it is obvious that many different embodiments of the invention may be made without departing from the spirit and scope thereof, it is to be understood that the invention is not limited to the specific embodiments described herein.

The embodiments of the invention in which an exclusive property or privilege is claimed are defined as follows:

1. Process for preparing polymers of molecular weight of at least 800 which have the sole recurring structural unit

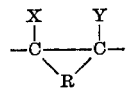

wherein R is alkylene of 3 through 10 carbon atoms which can be substituted with up to three substituents each selected from lower alkyl, halogen, phenyl, —$COCH_3$, —$COOR^1$ or —$OR^1$ wherein $R^1$ is lower alkyl; and X and Y each are selected from hydrogen, methyl, ethyl, phenyl, —$COCH_3$, —$COOR^1$ or —$OR^1$ wherein $R^1$ is defined as above, which comprises heating at least one monomer of the formula

wherein X, Y and R are as defined above, at temperatures of from about 200° to 400° C. at a pressure of from about 20 to 100 kilobars and thereafter recovering a polymer having the sole recurring structural units of the formula

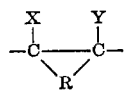

wherein X, Y and R are as defined above for the reaction product, and having a molecular weight of at least 800.

2. The process of claim 1 wherein the temperature range is from about 250° to 350° C. and the pressure is from about 60 to 70 kilobars.

3. A spinnable polymer of a monomer selected from cyclooctene and cyclododecene.

References Cited

Holmes-Walker et al., J. Chem. Soc. 1955, p. 2295.

Lecomte, Leendertse and Waterman, Compt. rend., 1947, 224, 193.

JOSEPH L. SCHOFER, Primary Examiner

R. A. GAITHER, Assistant Examiner

U.S. Cl. X.R.

260—63, 88.2, 89.1, 91.1, 91.5